(12) United States Patent
Horisawa

(10) Patent No.: US 6,293,622 B1
(45) Date of Patent: Sep. 25, 2001

(54) SEAT DEVICE

(75) Inventor: Kouta Horisawa, Kanagawa (JP)

(73) Assignee: Ikeda Bussan Co., Ltd., Ayase (JP)

( * ) Notice: Subject to any disclaimer, the term of this patent is extended or adjusted under 35 U.S.C. 154(b) by 0 days.

(21) Appl. No.: 09/362,858

(22) Filed: Jul. 29, 1999

(30) Foreign Application Priority Data

Jul. 29, 1998 (JP) .................................................. 10-213707

(51) Int. Cl.[7] .................................................. A47C 1/02
(52) U.S. Cl. .................... 297/344.1; 248/429; 296/65.01
(58) Field of Search .......................... 297/344.1, 311, 297/331, 335, 332, 463.1, 337; 248/429, 424; 296/65.13, 65.01

(56) References Cited

U.S. PATENT DOCUMENTS

| 4,089,500 | * | 5/1978 | Gustafsson | 248/429 |
| 5,120,103 | * | 6/1992 | Kave | 297/344.1 X |
| 5,285,993 | * | 2/1994 | Kamata et al. | 297/344.1 X |
| 5,286,076 | * | 2/1994 | DeVoss et al. | 248/429 X |
| 5,529,378 | * | 6/1996 | Chaban et al. | 297/344.1 X |
| 5,829,728 | * | 11/1998 | Hoshihara et al. | 297/344.1 X |
| 5,967,604 | * | 10/1999 | Yoshida et al. | 297/344.1 X |

FOREIGN PATENT DOCUMENTS 4-175431   6/1992 (JP) .

* cited by examiner

Primary Examiner—Peter M. Cuomo
Assistant Examiner—Stephen Vu
(74) Attorney, Agent, or Firm—Foley & Lardner

(57) ABSTRACT

A pair of first and second front leg members support a seat cushion on the floor. Each of the first and second front leg members is fixed to the floor. A third rear leg member for supporting the seat cushion is fixed to the seat cushion. A pair of first and second seat slide mechanisms for allowing the seat cushion to slide relative to the floor each has (1) a lower rail fixed to one of the first and second front leg members and (2) an upper rail fixed to the seat cushion. A third seat slide mechanism allows the third rear leg member to move relative to the floor.

15 Claims, 5 Drawing Sheets

SEAT DEVICE

BACKGROUND OF THE INVENTION

1. Field of the Invention

The present invention relates in general to a seat device for a motor vehicle, and more particularly to a seat device which is movable to a desired position in the fore-and-aft direction by a seat sliding mechanism.

2. Description of the Prior Art

In a seat device installed in a motor vehicle, a seat body, which is a combination of a seat cushion and a seat back, is usually adjusted in its forward-and-rearward position via a seat sliding mechanism according to the seat occupant's preference.

As illustrated in FIG. 5, there is a conventional seat device 10 of so-called a minivan type motor vehicle. This seat device 10 has a seat body 12 that is a combination of a seat cushion 12a and a seat back 12b. The seat device 10 further has right and left leg members 14, so that a space 16 is provided between the seat cushion 12a and a floor F of the motor vehicle. For example, this space 16 allows a seat occupant on another seat (not shown), which is arranged at the back of the seat device 10 in the motor vehicle, to put his or her feet therein. The seat device 10 further has a pair of seat sliding mechanisms 18 for moving the seat body 12 in the fore-and-aft direction. Each sliding mechanism 18 has a rail construction in which an upper rail (not shown) attached to each leg member 14 is slidably engaged with a lower rail 20 formed on the floor F, thereby allowing the sliding movement of the seat body 12 relative to the floor F. The sliding mechanisms 18 are provided with (1) a locking means (not shown) for locking the seat body 12 and (2) a lever 22 for releasing the locked condition of the seat body 12. Depending on the position of the seat body 12 in the fore-and-aft direction, the lower rail 20 may be exposed in the interior of the motor vehicle.

SUMMARY OF THE INVENTION

It is, therefore, an object of the present invention to provide a seat device equipped with a sliding mechanism, which is improved in external appearance, spaciousness and rear-seat occupant comfortability.

A seat device according to the present invention comprises the following members: i. A seat cushion disposed on a floor. ii. A pair of first and second front leg members for supporting the seat cushion. Each of the first and second front leg members is fixed to the floor. iii. A third rear leg member for supporting the seat cushion. The third rear leg member is fixed to the seat cushion. iv. A pair of first and second seat slide mechanisms for allowing the seat cushion to slide relative to the floor. Each seat slide mechanism comprises (1) a lower rail fixed to one of the first and second front leg members and (2) an upper rail fixed to the seat cushion and slidably engaged with the lower rail. v. A third seat slide mechanism for allowing the third rear leg member to slide together with the seat cushion relative to the floor.

BRIEF DESCRIPTION OF THE DRAWINGS

FIG. 1b is a cross section taken along the lines A—A of FIG. 1a;

FIG. 3b is a cross section taken along the lines B—B of FIG. 3a;

DESCRIPTION OF THE PREFERRED EMBODIMENTS

Referring to FIGS. 1a, 1b, 2, 3a, 3b and 4, there are shown first and second automotive seat devices according to first and second preferred embodiments of the present invention. In these embodiments, parts and portions substantially the same are denoted by the same numerals.

Figure 1A:
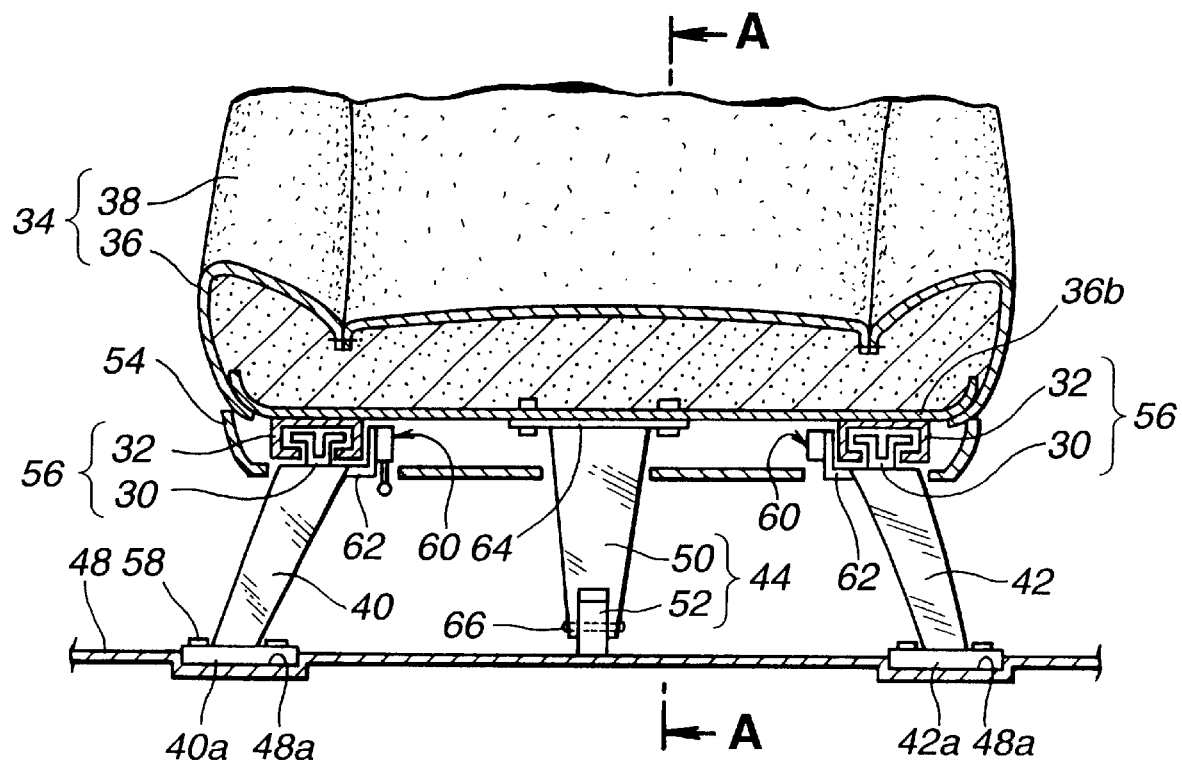
FIG. 1a is a cross section of an essential portion of a seat device being cut in the right-and-left direction, according to a first embodiment of the present invention.
Figure 1B:
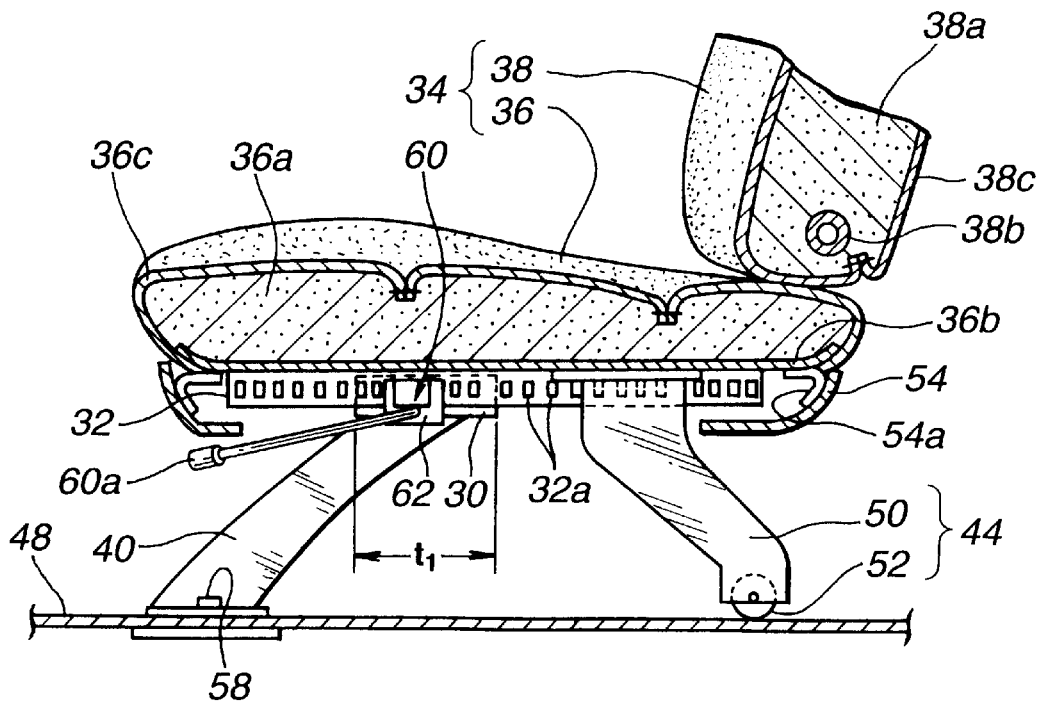
Figure 3A:
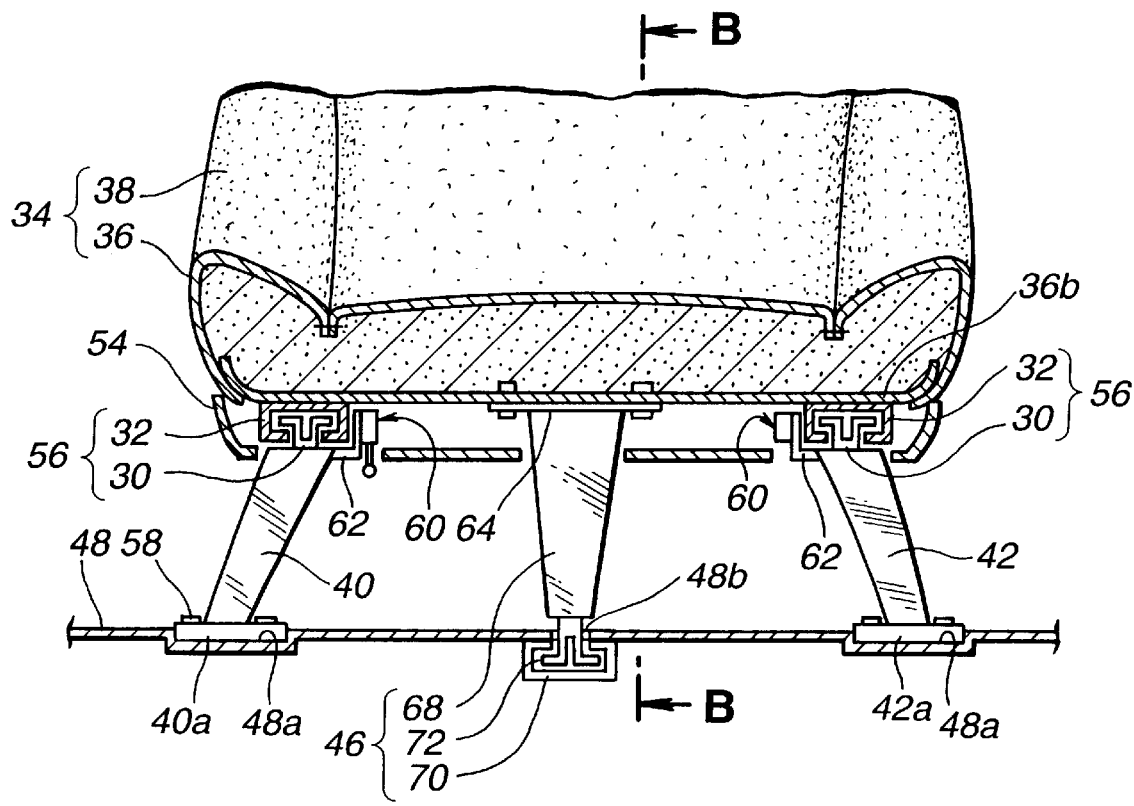
FIG 3a is a cross section of an essential portion of a seat device being cut in the right-and-left direction, according to a second embodiment of the present invention.
Figure 3B:
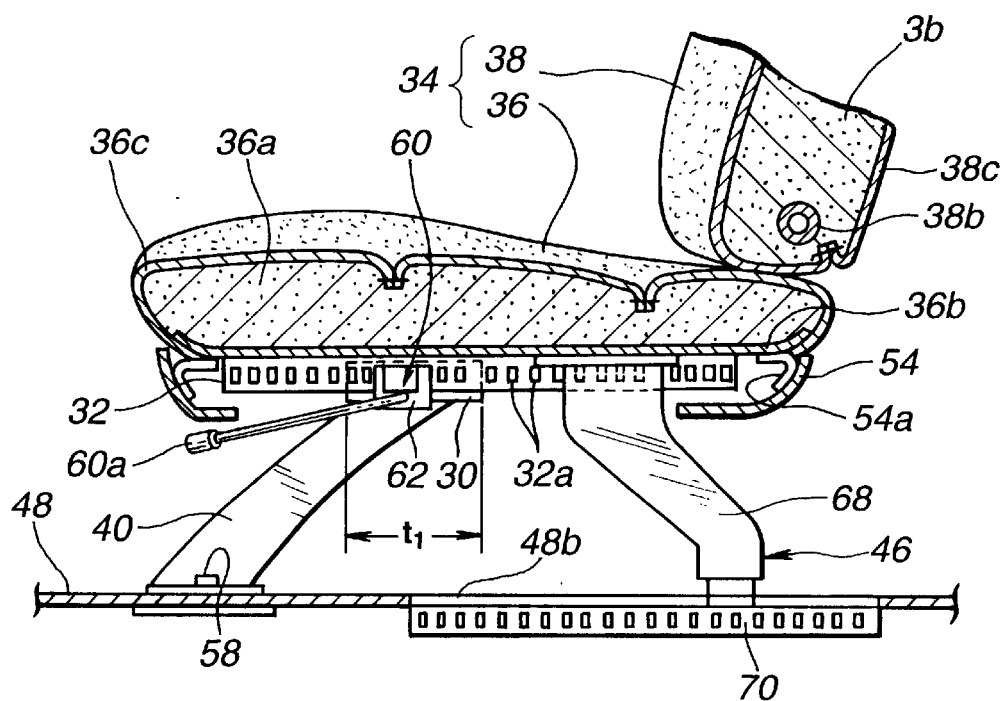

In each embodiment, a lower rail 30 ($t_1$ in length) on the fixed side is shorter than an upper rail 32 on the movable side (See FIGS. 1b and 3b.). Therefore, wherever a seat body 34, which is composed of a seat cushion 36 and seat back 38, is moved and positioned in the fore-and-aft direction, it is possible to substantially conceal the lower rail 30 by the upper rail 32, thus improving comfortability, external appearance and safety in the vehicle.

Figure 2:
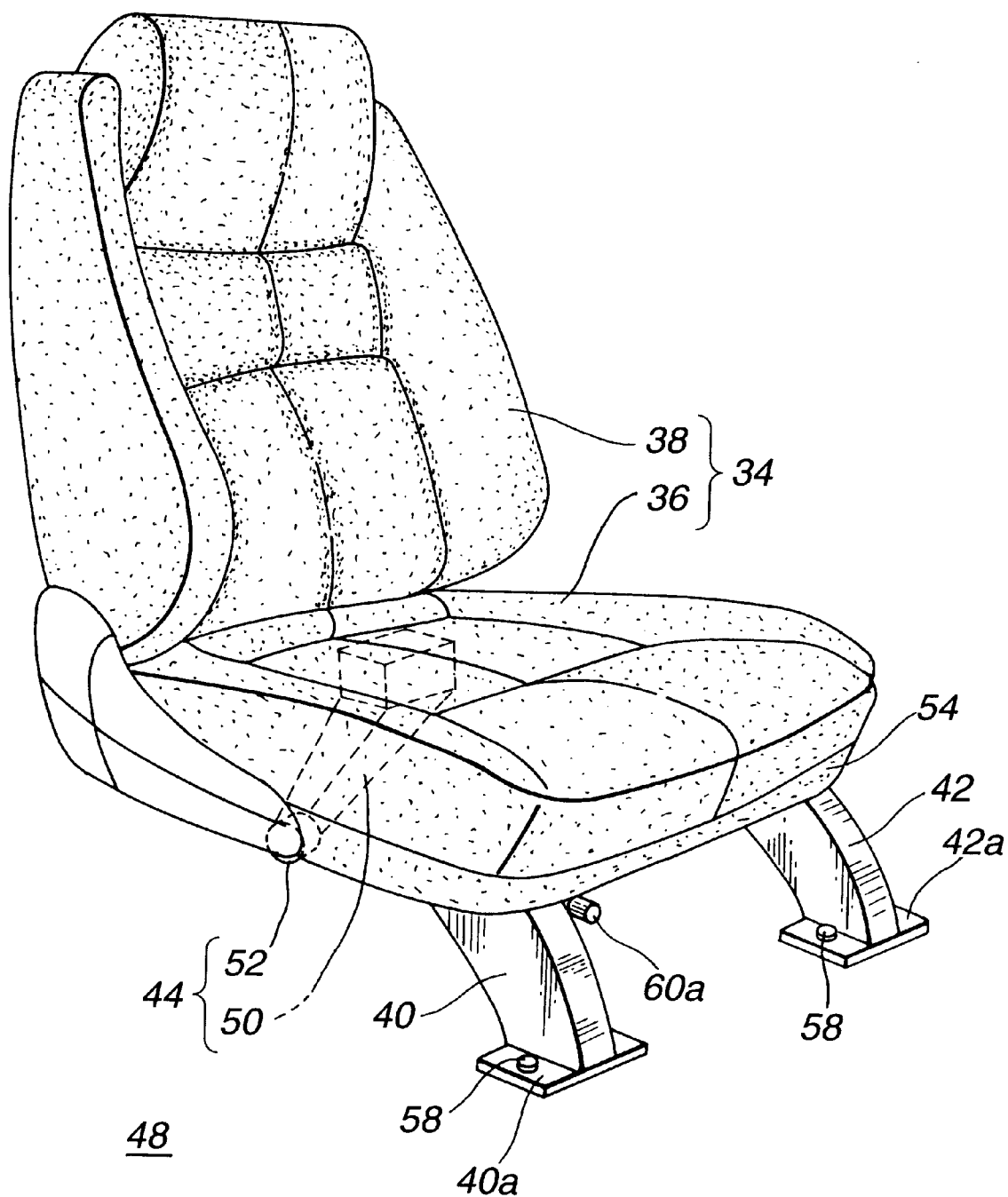
FIG. 2 is a perspective view of the seat device installed on the floor, which is illustrated in FIGS. 1a and 1b.
Figure 4:
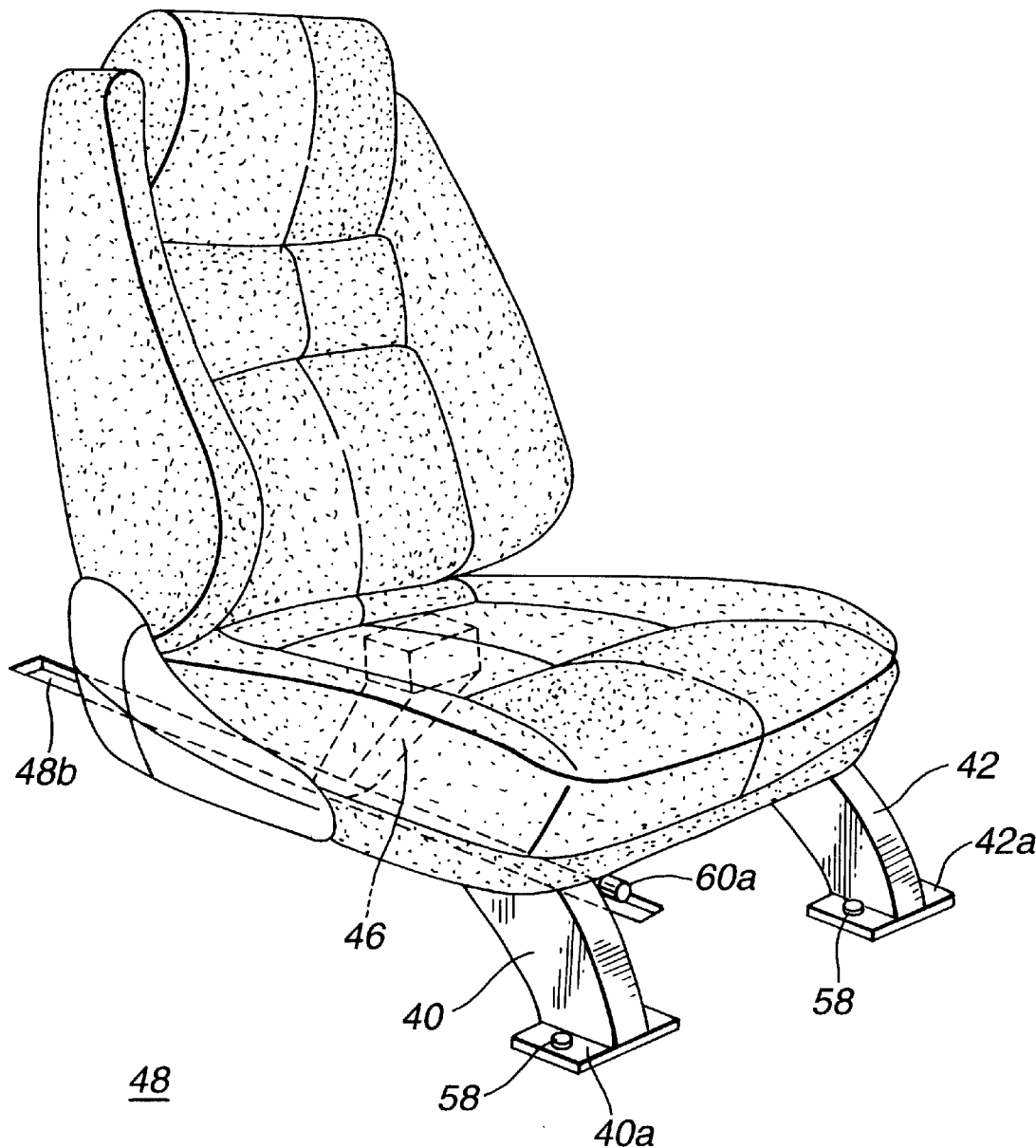
FIG. 4 is a perspective view of the seat device installed on the floor, which is illustrated in FIGS. 3a and 3b.
Figure 5:
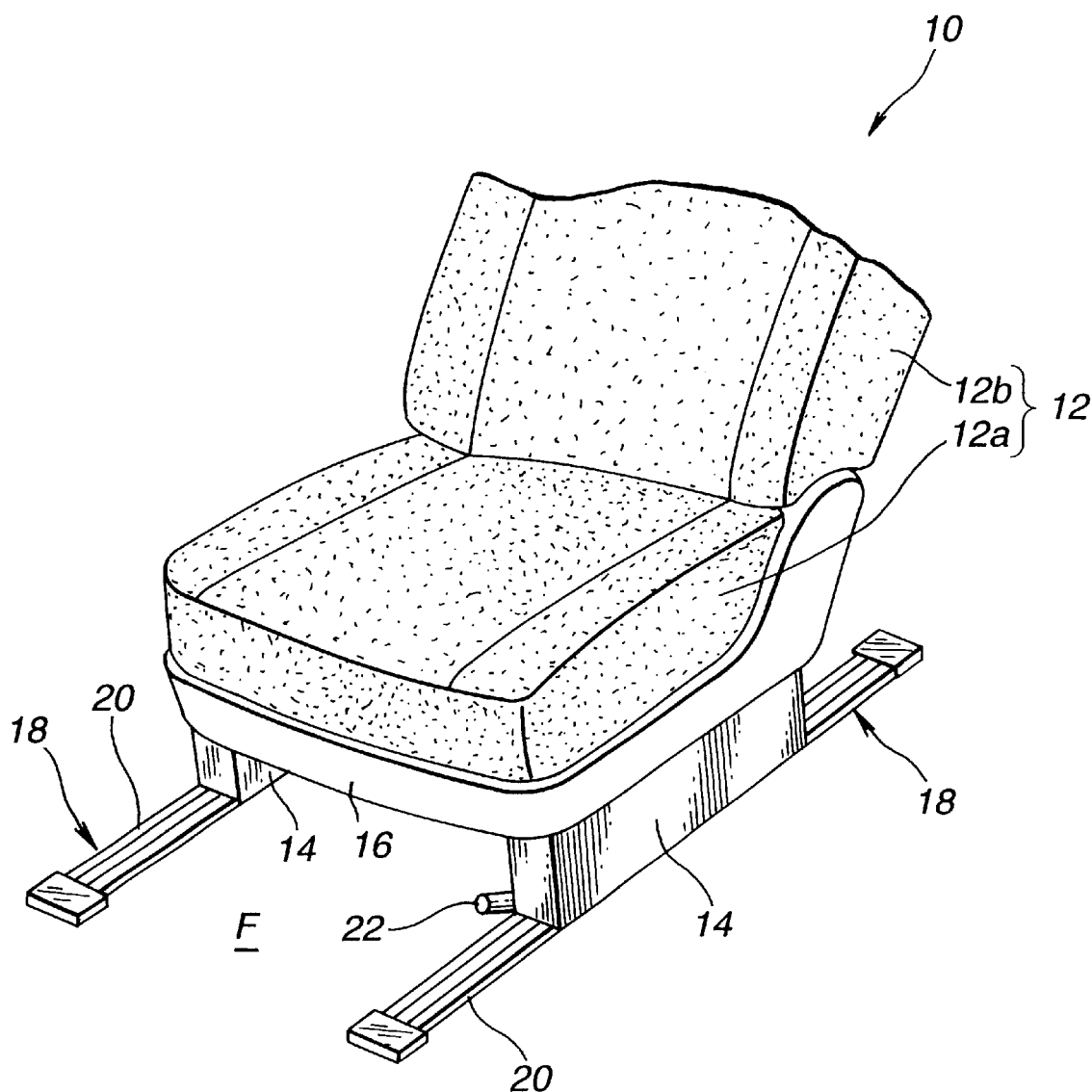
FIG. 5 is a perspective view of a conventional seat device.

In each embodiment, the seat body 34 is supported by a first front leg member 40 and a second leg member 42, and by a rear sliding member 44 or a rear sliding member 46, thus securing a stable supported condition of the seat body 34 (See FIGS. 2 and 4.). The rear sliding member 44 or the rear sliding member 46 is positioned in a substantially middle portion of the seat body 34, with respect to the transverse direction of the seat body 34. Therefore, the rear seat occupant who is seated at the back of the seat body 34 can put his/her legs in a space between the seat cushion 36 and a floor 48, and luggages can be smoothly put therebetween.

In the first embodiment, the rear sliding member 44 is composed of a third leg member 50 and a caster 52 disposed at the lower end of the third leg member 50. In this case, there is no need for forming a groove on the floor 48, as compared with the second embodiment.

In each embodiment, a pair of sliding mechanisms 56 are disposed on the first front leg member 40 and the second front leg member 42 for allowing the seat body 34 to be adjustably moved forward and rearward. Disposed at the rear middle portion of the bottom surface of the seat cushion 36 is the rear sliding member 44 for slidably supporting the seat body 34 on the floor 48.

The seat cushion 36 and the seat back 38 respectively have a pad 36a and a pad 38a held by a frame 36b and a frame 38b and are coated with an outer skin member 36c and an outer skin member 38c. The seat back 38 is adjustably tilted at a desired angle against the seat cushion 36 by a reclining mechanism (not shown). The seat cushion 36 is provided at its lower periphery with a garnish 54 attached to the frame 36b using brackets 54a. With this, the sliding mechanisms 56 are almost concealed from seat occupant's view.

The first front leg member 40 and the second leg member 42 respectively have a flange 40a and a flange 42a at the lower end thereof, and are fixed, using fasteners 58, to a pair of positioning concave portions 48a on the floor 48, as shown in FIGS. 1a and 3a.

In each embodiment, the upper rail 32 is fixed to a side end portion of the frame 36b (pan-shaped frame) of the seat cushion 36. The lower rail 30, which is $t_1$ in length (shorter than the upper rail 32), is fixed on the upper end surface of the first front leg member 40 and the second leg member 42. The upper rails 32 are arranged in the fore-and-aft direction of the seat body 34. The lower rail 30 is designed ¼ to ½ times the upper rail 32 in length. Even when the upper rail 32 is moved to the forward end or rearward end along the lower rail 30, the lower rail 30 can be prevented from being exposed since the lower rail 30 is always positioned below the seat cushion 36. A pair of a locking means 60 are fixed to the inner sides of the upper ends of the first front leg member 40 and the second leg member 42 by brackets 62 each having a vertical wall portion extending along the vertical side of the upper rail 32. One of the locking means 60 has a lever 60a which extends frontward from the locking means 60. When the lever 60a is in an inoperative condition, a locking pin (not shown) of the locking means 60 is biased by a spring force. In this condition, the locking pin is inserted into one of a plurality of engagement openings 32a of the upper rail 32 and one engagement opening (not shown) of the lower rail 30. With this, the seat body 34 is locked at a certain portion. This locked condition can be released using the lever 60a. In fact, when the lever 60a is brought into an operative position by the seat occupant, the locking pin is taken out of the above-mentioned engagement openings of the lower rail 30 and the upper rail 32. In this condition, the seat body 34 becomes movable to a desired position. The locking means 60 on both sides are interconnected through a wire (not shown) such that the both locking pins are inserted into or taken out of the engagement openings by moving the lever 60a.

As is seen from FIG. 2, the rear sliding member 44 is composed of a third leg member 50 which is disposed at a rear middle portion of the seat cushion 36, and a caster 52 which is disposed at the lower end of the third leg member 50, thus slidably supporting the rear portion of the seat body 34. Namely, the third leg member 50 is fixed at its flange 64 to the frame 36b of the seat cushion 36, thus supporting, via the caster 52 and in cooperation with the first front leg member 40 and the second leg member 42, the seat cushion 36 in a substantially horizontal condition on the floor 48. The caster 52 is partly received in a groove of the lower end of the third leg member 50 and rotatably connected to the third leg member 50 via a pin 66.

The seat device constructed as above can be installed in a motor vehicle by fixing the first front leg member 40 and the second front leg member 42 to the floor 48 using fasteners 58. Thereafter, to move the seat body 34 to a desired position in the fore-and-aft direction, the following steps should be taken: Disengage the upper rail 32 from the lower rail 30 by moving the lever 60a of the locking means 60 to the operative position. Move the seat body 34 to a desired position. Then, the seat body 34 is locked at this position by returning the lever 60a to the inoperative position. During the above-movement, the seat body 34 is allowed to slide smoothly and stably by the sliding mechanisms 56 and the rear sliding member 44.

In the second embodiment, as shown in FIG. 3b, the rear sliding member 46 is composed of a third leg member 68 and a lower guide rail 70 formed on the floor 48, the lower end portion of the third leg member 68 being slidably engaged with the lower guide rail 70. In fact, the lower guide rail 70 is fitted into a groove 48b formed on the floor 48. This construction assures a stable sliding operation.

The other parts of the seat device of the second embodiment are identical with those of the seat device of the first embodiment. Therefore, the description of those is not repeated in the following.

The third leg member 68 is formed at its lower end portion with an upper sliding rail 72 that is slidably engaged with the lower guide rail 70, thus slidably supporting the rear portion of the seat body 34. Namely, the third leg member 68 is fixed at its flange 64 to the frame 36b of the seat cushion 36. The upper sliding rail 72 is so short in length relative to the lower guide rail 70 that the seat body 34 can be moved to the front-most and rear-most positions.

The lower guide rail 70 is substantially rectangular "U-like" in shape in its cross section, and may be as long as the upper rail 32 directly secured to the seat cushion 36. The lower guide rail 70 is fitted into the groove 48b and welded to the floor.

A combination of the lower guide rail 70 and the upper sliding rail 72 in the second embodiment secures a more stable sliding operation than that of the first embodiment. In the second embodiment, it is optional to lock the third leg member 68 at a desired position by engaging the upper sliding rail 72 with the lower guide rail 70 through the movement of the lever 60a. Although not shown in the drawing, the lower rail 70 may be formed directly on the floor with the omission of the groove 48b.

What is claimed is:

1. A seat device comprising:
   a seat cushion;
   a pair of first and second front leg members for supporting said seat cushion on a floor, each of the first and second front leg members being adapted to be fixed to the floor;
   a third rear leg member for supporting said seat cushion, said third rear leg member being fixed to said seat cushion;
   a pair of first and second seat slide mechanisms for allowing said seat cushion to slide relative to the floor, each of said seat slide mechanisms comprising a lower rail fixed to one of said first and second front leg members and an upper rail fixed to said seat cushion and slidably engaged with said lower rail; and
   a third seat slide mechanism for allowing said third rear leg member to slide relative to the floor.

2. A seat device according to claim 1, wherein each said lower rail has a length that is shorter than that of each said upper rail such that each said lower rail is substantially concealed by each said upper rail even when said seat cushion is moved to foremost and rear-most positions.

3. A seat device according to claim 1, wherein the length of each said lower rail is ¼ to ½ the length of each said upper rail.

4. A seat device according to claim 1, wherein said third seat slide mechanism comprises a caster disposed at a lower end portion of said third rear leg member.

5. A seat device according to claim 1, wherein said third seat slide mechanism comprises a guide rail adapted to be fixed on said floor, said third rear leg member being slidably engaged at a lower end thereof with said guide rail.

6. A seat device according to claim 5, wherein said third seat slide mechanism further comprises a sliding rail formed on said lower end of said third rear leg member, said sliding rail being slidably engaged with said guide rail.

7. A seat device according to claim 5, wherein said guide rail is adapted to be fitted in a groove formed on said floor, and wherein said sliding rail of said third rear leg member has a length shorter than that of said guide rail such that said seat cushion is allowed to move to foremost and rear-most positions.

8. A seat device according to claim 1, further comprises a locking means for locking said seat cushion at a position.

9. A seat device according to claim 1, wherein said upper rail of each said seat slide mechanism is directly fixed to said seat cushion.

10. A seat arrangement comprising:

a seat having a cushion portion;

first and second guide rail members fixed to a lower surface of the cushion portion;

first and second legs having lower ends adapted to be fixed to a floor and upper ends respectively slidably engaged with the first and second guide rail members;

a third leg having an upper end fixedly connected to the lower surface of the cushion portion and a lower free end which is adapted to proximate the floor.

11. A seat arrangement as set forth in claim 10, wherein the lower free end of the third leg is slidably received in a third guide rail member adapted to be fixed to the floor.

12. A seat arrangement as set forth in claim 11, where the lower free end of the third leg has a rail member which is slidably received in a third guide rail member adapted to be fixed to the floor.

13. A seat arrangement as set forth in claim 11, wherein the third guide rail is shorter than the first and second guide rails, and is located so as to substantially be concealed by the seat cushion portion.

14. A seat arrangement as set forth in claim 11, wherein the length of the third guide rail member is ¼ to ½ of the distance between the first and second guide rail members.

15. A seat arrangement as set forth in claim 10, wherein the lower free end of the third leg is provided with a caster which is adapted to roll on the floor.

* * * * *